Feb. 11, 1964 E. J. SUPERNOWICZ 3,120,806

MAGNETIC IMAGE PLATE

Filed April 24, 1957 7 Sheets-Sheet 1

INVENTOR.
EDWARD J. SUPERNOWICZ

BY John B. Clark

ATTORNEY

Feb. 11, 1964 E. J. SUPERNOWICZ 3,120,806

MAGNETIC IMAGE PLATE

Filed April 24, 1957 7 Sheets-Sheet 2

Feb. 11, 1964 E. J. SUPERNOWICZ 3,120,806

MAGNETIC IMAGE PLATE

Filed April 24, 1957 7 Sheets-Sheet 6

Feb. 11, 1964 E. J. SUPERNOWICZ 3,120,806

MAGNETIC IMAGE PLATE

Filed April 24, 1957 7 Sheets-Sheet 7

United States Patent Office 3,120,806
Patented Feb. 11, 1964

3,120,806

MAGNETIC IMAGE PLATE

Edward J. Supernowicz, Santa Clara, Calif., assignor to International Business Machines Corporation, New York, N.Y., a corporation of New York Filed Apr. 24, 1957, Ser. No. 654,955
4 Claims. (Cl. 101—426)

This invention relates to printing and more specifically to a method of magnetically preparing a magnetic image plate for printing electrical circuits or conventional copy.

In the printed circuit art, the usual method of preparing a printed circuit includes preparing a printing plate for effecting a representation of the conductors of the circuit; making an imprint by the aid of the printing plate upon a surface, differentiating on that surface the areas which are required to be conductive from the areas which are required to be non-conductive; and from the imprint, producing a conductor by subjecting the printed surface to treatment which operates differently on the areas of the surface thus differentiated, such as by etching or by deposition of conductive particles. According to the invention, a magnetic image of the printed circuit is formed in a magnetically retentive plate. The plate is placed beneath a sheet or base for the printed circuit and magnetic particles are distributed on the sheet, aligning themselves in accordance with the image. In this manner the image plate differentiates upon the sheet or base between areas to be treated and areas not to be treated. An object of this invention, therefore, is the provision of a novel method of preparing a magnetic image plate.

In making the differentiating imprint with the printing plate of the prior art, as explained above, it is not unusual to find a certain amount of smudged or darkened areas upon the background, i.e. "backgrounding" as that term is understood in the printing art. It is, therefore, another object of this invention to provide a novel image plate which eliminates "backgrounding."

Whenever the imprint is not to be made directly upon the permanent base material upon which the printed circuit will be formed, it is usual for an imprint to be made upon a temporary base material followed by a contact transfer process. It is another object of this invention, therefore, to provide an improved method of preparing printed circuits which eliminates this process.

It is another object of this invention to provide a novel method of printing magnetically wherein the face of the printing plate is protected against scarring by foreign matter deposited thereon.

It is still another object to provide a method of magnetic printing wherein the definition of the printed copy is improved.

Other objects of the invention will be pointed out in the following description and claims and illustrated in the accompanying drawings which disclose, by way of example, the principle of the invention and the best mode which has been contemplated of applying that principle.

In the drawings:

FIG. 1 is a perspective view of one type of master copy of a circuit representation.

FIG. 1*a* is a sectional view of FIG. 1 taken along line 1*a*—1*a* after magnetic particles have been sprinkled upon the tacky ink of the master.

FIG. 1*b* is a sectional view similar to FIG. 1*a* after resin-coated particles have been fused upon the ink 101 of the master.

FIG. 2 is a perspective view of another type of master prepared with magnetic ink.

FIG. 2*a* is a sectional view of FIG. 2 taken along line 2*a*—2*a*.

FIG. 3 is a perspective view of an engraved type of master.

FIG. 3*a* is a sectional view of FIG. 3 taken along line 3*a*—3*a* showing engraving upon a metal sheet by impact printing thereon.

FIGS. 3*b* and 3*c* are sectional views similar to FIG. 3*a* showing a partial and total etching respectively, of the master, wherein a sheet of supporting material has been provided beneath the master.

FIG. 4 is a perspective view of a master prepared by gluing a wire upon a lamina or sheet.

FIG. 4*a* is a sectional view of FIG. 4 taken along line 4*a*—4*a*.

Figures 9, 10, 11, 12, 13, 14, 14A, 15, 16, 16A, 17:
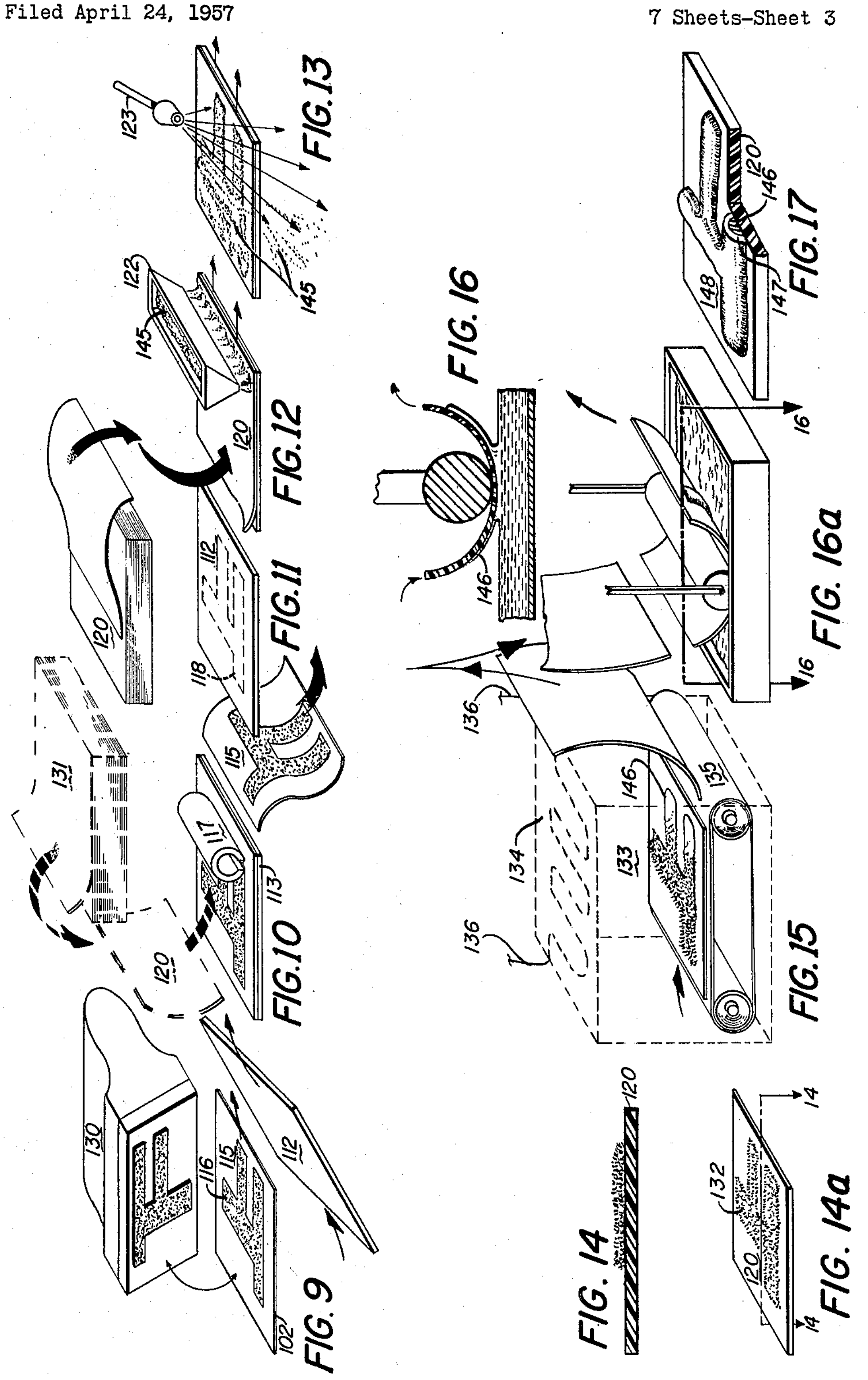

FIG. 9 diagrammatically represents marking of a master.

FIG. 10 shows the positioning of an image plate against a master and their passage together under a magnet.

FIG. 11 shows an image plate with a magnetic image of a master thereon (shown in invisible outline).

FIG. 12 shows the passage of a circuit base and an image plate together under a hopper depositing magnetic particles.

FIG. 13 shows the passage of a circuit base and an image plate under an air jet as it removes excess particles from the circuit base.

FIG. 14 is a sectional view of a circuit base taken along line 14—14 of FIG. 14*a*, showing the condition of aligned particles thereon prior to their entry into the oven of FIG. 15.

FIG. 14*a* is a perspective view of the circuit base in FIG. 14.

FIG. 15 shows the fusing of the particles as they are conveyed through an oven.

FIGS. 16 and 16*a* are a diagrammatic representation in perspective, shown also in section along line 16—16, of solder dipping of the fused circuit upon the circuit base.

FIG. 17 is a perspective view in partial section of the final printed circuit prepared by the process shown in FIGS. 9 through 17.

FIGS. 18 through 22 are similar to FIGS. 9 through 13 and represent the initial steps of preparing printed circuits by an etching method.

Figures 18, 19, 20, 21, 22, 23, 24, 24A, 25, 26, 27, 28:
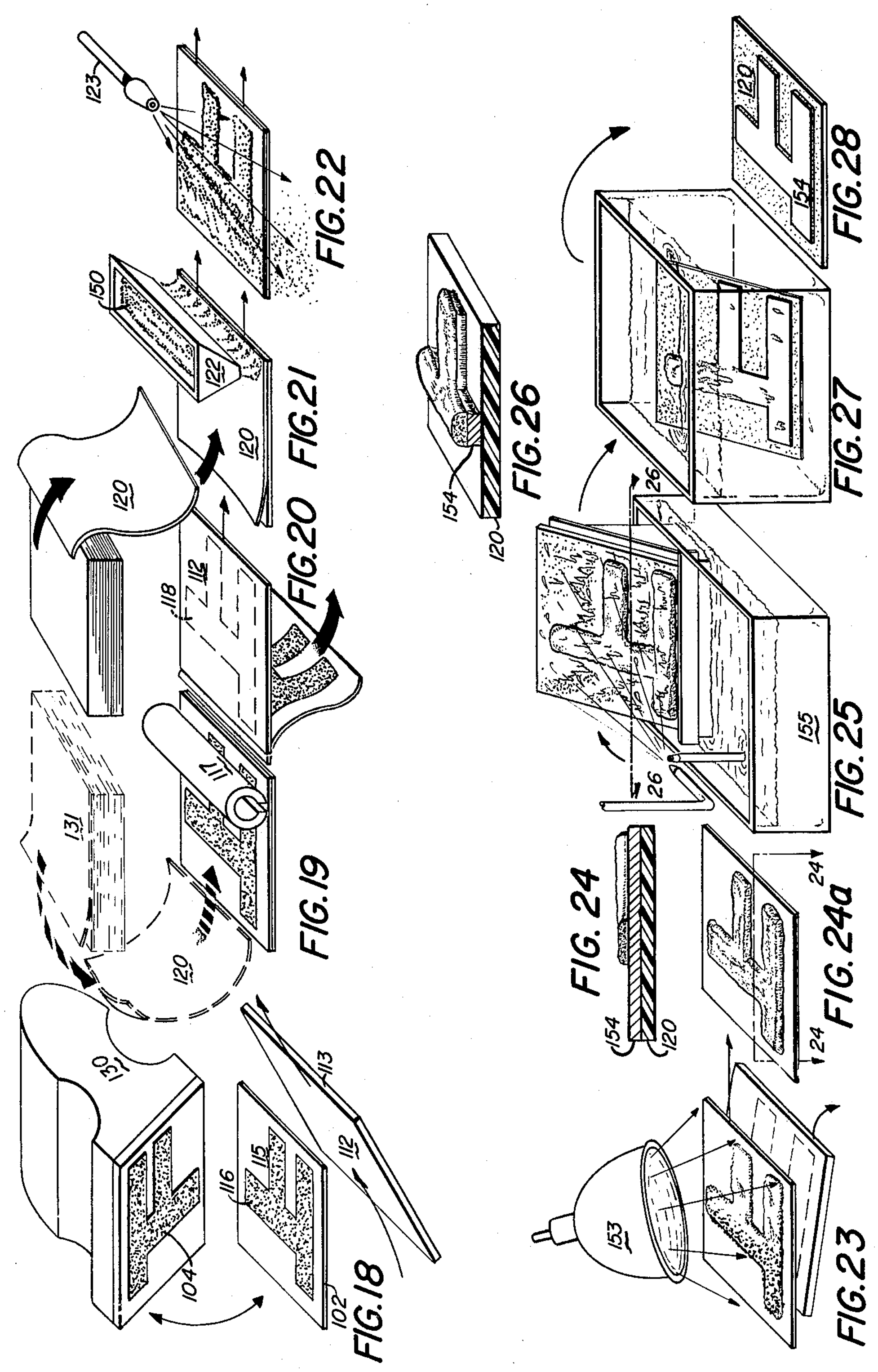

FIG. 23 is a perspective view showing heat fusion of protective magnetic particles upon a circuit base by means of a heat source shown as an infrared light.

FIGS. 24 and 24*a* show the circuit base in perspective and cross-section prior to its entry into the etching bath of FIG. 25.

FIG. 25 is a perspective view of an etching bath shown schematically.

FIG. 26 is a cross-section perspective view of a circuit base taken along line 26—26 of FIG. 25 showing the condition of the circuit base as it leaves the etching bath.

FIG. 27 is a perspective schematic representation of the immersion of the base in a solvent of its protective coating.

FIG. 28 is a perspective view of the final printed circuit product showing a solid, conductive circuit upon a circuit base.

Figure 29:
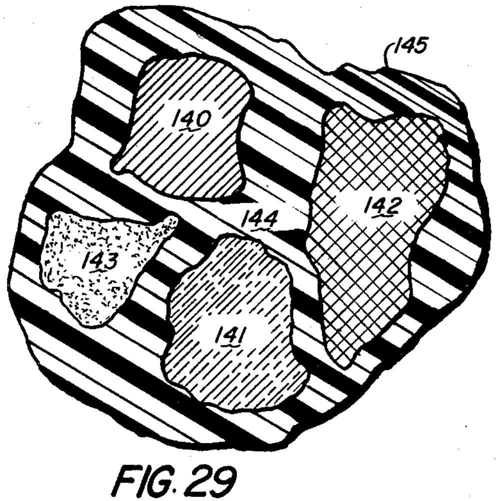

FIG. 29 is a greatly enlarged cross-sectional view of a conductive magnetic particle showing its constituent granules.

Figure 30:
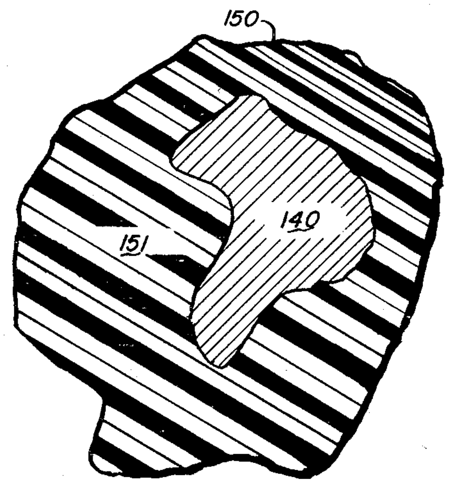

FIG. 30 is a greatly enlarged cross-sectional view of a protective magnetic particle showing its constituent granules.

Figure 31:
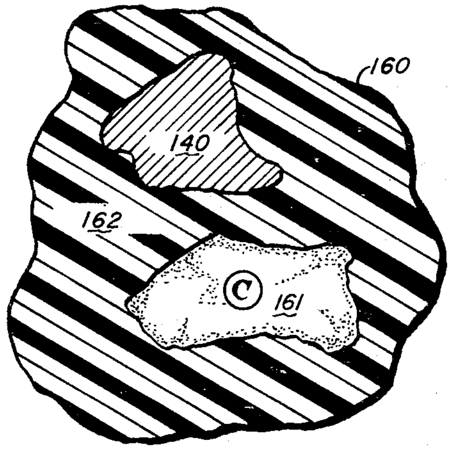

FIG. 31 is a greatly enlarged cross-sectional view of a pigmented magnetic particles showing its constituent granules.

Figure 32:
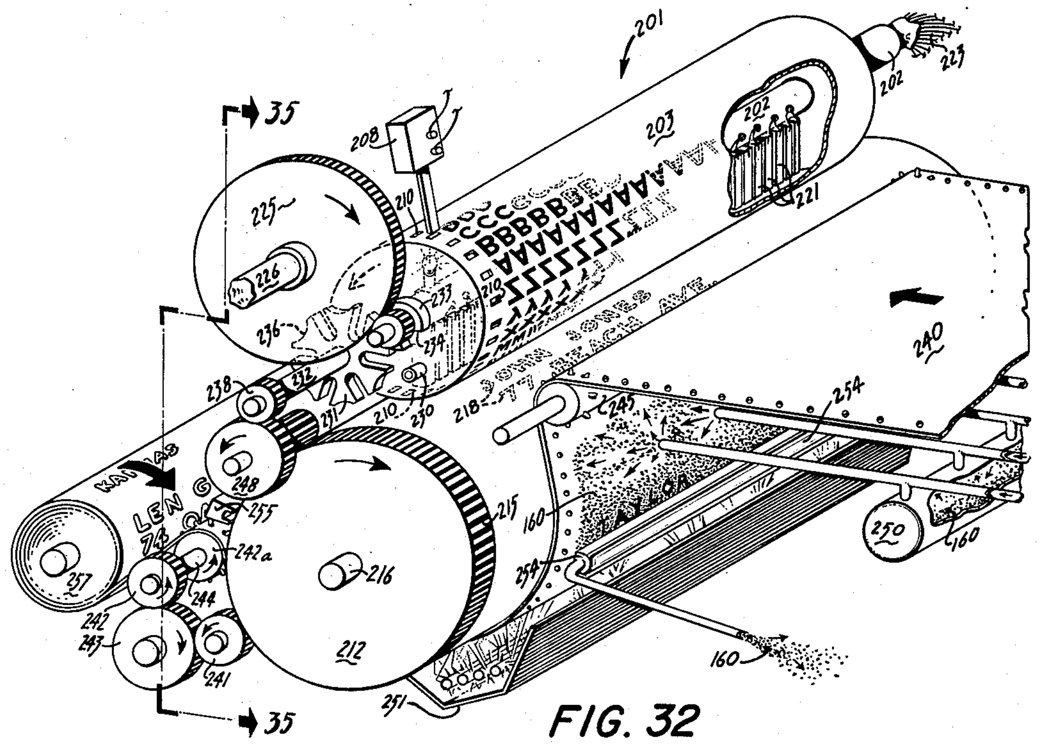

FIG. 32 is a perspective view of a printer with partial sections taken therein for clarity.

Figures 33, 34, 35:
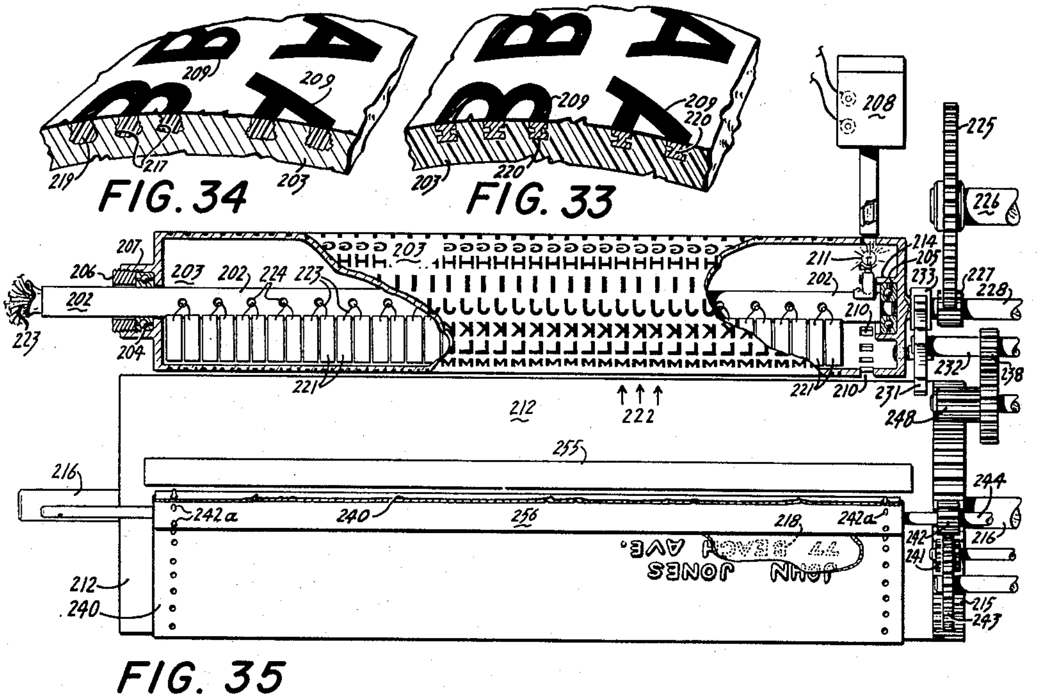

FIG. 33 is a sectioned portion of a character drum 203 showing one construction thereof.

FIG. 34 shows an alternative construction of the character drum 203.

FIG. 35 is a sectional view of the printer of FIG. 32 taken along line 35—35 of FIG. 32.

Figure 36:
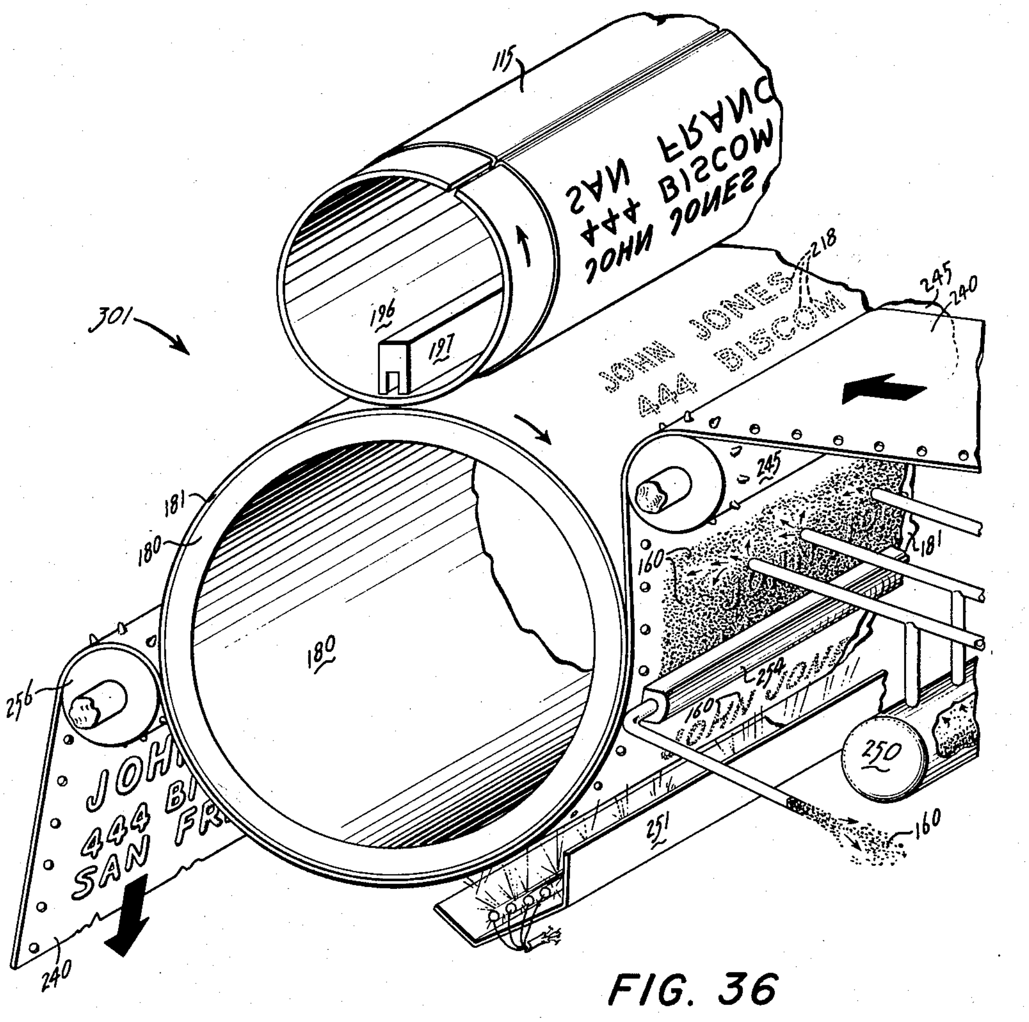

FIG. 36 is a perspective view of a duplicator embodying the invention.

This invention relates to a novel method for producing printed circuits by the aid of forming a magnetic image of a circuit representation in a highly retentive magnetic material to be used as an image plate; placing the image plate thus prepared against a sheet of material, such as phenolic, mica, ceramic or porcelain, etc., upon which the printed circuit will be formed; aligning magnetic particles thereon in accordance with the circuit representation; and treating the aligned particles and associated sheet so as to create circuit conductors in the configuration of the circuit representation. The image plate itself is comprised of any highly retentive magnetic material, such as cobalt-nickel. If a magnet of the type which produces vertical lines of flux (herein called a vertical magnet) is used for preparing the image plate, the retentive magnetic material preferably should be plated or coated upon a backing plate of magnetic material of low retentivity to afford a concentrated flux through the highly retentive magnetic material. A backing plate is not necessary where a magnet producing horizontal lines of flux (herein referred to as a horizontal magnet) is so used.

Since small magnetic particles are not substantially attracted by a homogeneous magnetic field when present therein, in order to magnetically attract and thereby align such particles upon a sheet or circuit base in accordance with the magnetic image of the circuit representation, it is necessary to produce on the image plate divergent or non-homogeneous lines of flux in an otherwise homogeneous magnetic field. This is done by first creating a homogeneous field and then producing the non-homogeneous lines therein. To produce this homogeneous field on the image plate, it is only necessary to pass the image plate under a magnet. This initial step is unnecessary if a magnet of the type producing horizontal lines of flux is used as the image-creating magnet. It has been found that magnetic particles, changes in the flux path reluctance, the shielding effect of a conductive material, etc. will produce divergent lines of flux in the initially homogeneous field of the image plate. To effect this change, a master copy of the circuit is provided as described hereinafter.

The master is a lamina with a representation of a circuit marked thereon or therein. It is marked in a manner such that when it is subjected to the field of a magnet, together with the image plate, it will selectively produce non-homogeneous lines of flux in the aforementioned homogeneous magnetic field of the image plate. Marking the master to accomplish this result may be done in any of several ways; however, it has been found that best results are obtained when the master occupies a position between the magnet and the highly retentive magnetic surface of the image plate.

Figures 1, 1A, 1B, 2, 2A, 3, 3A, 3B, 3C, 4, 4A:
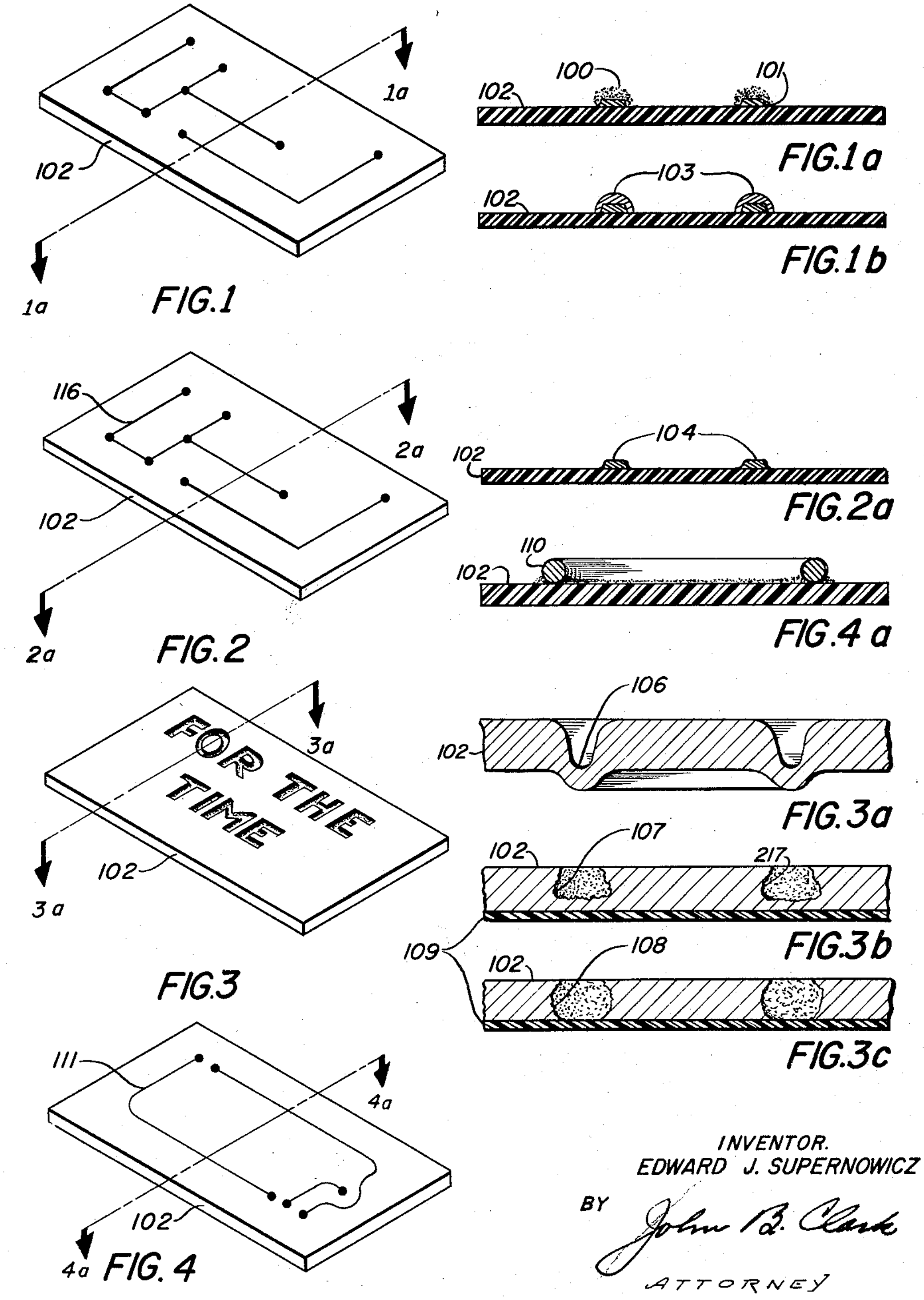

FIGS. 1, 1*a* and 1*b* illustrate marking by dusting finely divided magnetic particles 100 upon tacky ink 101 printed upon a sheet or lamina 102, or in the alternative, dusting resin-coated magnetic particles upon tacky ink followed by heat fusing as at 103. Referring to FIGS. 2 and 2*a*, a circuit representation 116 is printed with magnetic ink 104 or magnetic carbon paper. Referring to FIGS. 3 and 3*a*, the printing recorded upon lamina 102 has been engraved therein by impact printing as at 106. As shown in FIGS. 3*b* and 3*c*, the engraving upon a lamina may be by a selective partial or total etching away as at 107 and 108, respectively. In this case, a non-magnetic supporting material 109 is required to prevent the centers of the letters from falling out or to provide added strength to lamina 102. Finally, referring to FIGS. 4 and 4*a*, a wire 110 of magnetic material of low retentivity (a mu of approximately 30 or above yields best results) may be glued or attached to lamina 102 to form a pattern 111. The lamina 102 in FIGS. 1, 2 and 4 is of any suitable non-magnetic material, preferably a non-conductor. In FIG. 3, lamina 102 may be of any suitable magnetic material of low retentivity having high permeability.

The process of preparing the image plate, as explained in detail hereinafter, can be summarized as follows:

(1) A uniform magnetic field is created in a lamina of highly retentive magnetic material (i.e. an image plate) by subjecting it to unidirectional magnetic flux;

(2) A master, marked as described above with reference to FIGS. 1 through 4, is placed upon the image plate; and (3) The master and image plate are pressed together and subjected to the field of a magnet, the master occupying a position between the magnet and the image plate.

Figure 5:
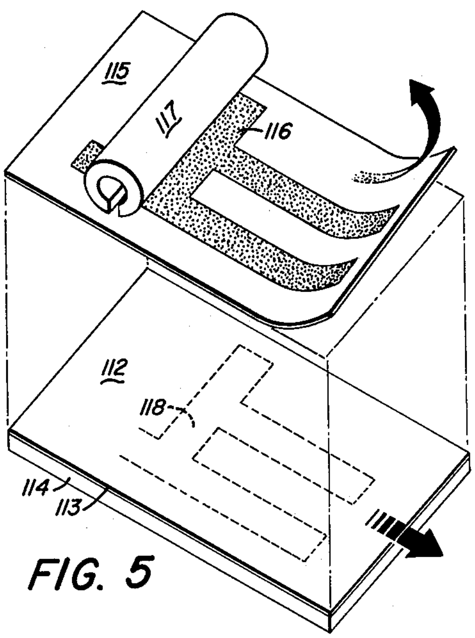
FIG. 5 is an expanded perspective view showing the creation upon an image plate of a magnetic image (in invisible outline) of the pattern on the master.

Referring to FIG. 5, a master 115, produced as described above, bearing representation 116 of the circuit is positioned upon an image plate 112. Plate 112 is comprised of a layer 113 of highly retentive magnetic material, such as cobalt-nickel, and a backing plate 114 of highly permeable magnetic material having low retentivity characteristics. It is to be understood that the backing plate 114 is required only when a vertical magnet (not shown) is used in the process, except as it may be needed to provide physical support for layer 113. It is to be noted that by applying master 115 so that the printed material is in contact with the highly retentive magnetic surface of plate 112, a more effective transfer is produced. The plate 112 and master 115 are subjected together to the field of a magnet 117, the master occupying a position between magnet 117 and plate 112. As shown in FIG. 5, this is done by passing them under a horizontal magnet 117. By thus passing the plate 112 and master 115 under the magnet, a latent magnetic image 118 is formed in plate 112, as explained above. The image thus formed is of excellent definition due to the proximity of representation 116 and plate 112 as they pass through the field of the magnet.

Figures 6, 8:
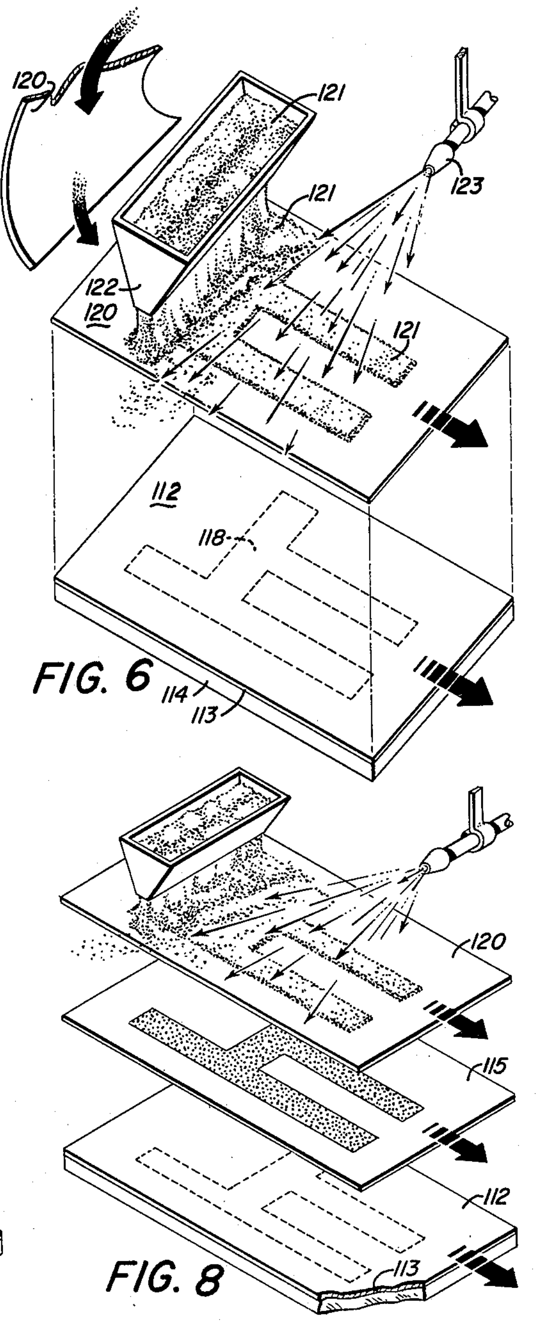
FIG. 6 is also an expanded perspective view showing magnetic alignment of particles in accordance with the image in the image plate.
FIG. 8 is also an expanded perspective view showing magnetic alignment of particles in accordance with the image plate prepared by the method of FIG. 7.

As shown in FIG. 6, with the image 118 now formed in plate 112, master 115 is removed and a sheet 120 for the printed circuit is placed upon plate 112. Sheet 120 and plate 112 are passed under a hopper 122 and an air jet 123. Special magnetic particles 121, as described below, are spread from hopper 122 upon sheet 120. Subsequently, air jet 123 blows away those magnetic particles 121 not restrained by the magnetic attraction from image 118, thus leaving on sheet 120 a configuration of magnetic particles which differentiates conductive from non-conductive areas. Hence by using the invention herein, no transfer step is employed in making a differentiating imprint upon sheet 120, and "backgrounding" is eliminated completely. In addition, no particles have contacted the face of plate 112 so as to scar it.

Figure 7:
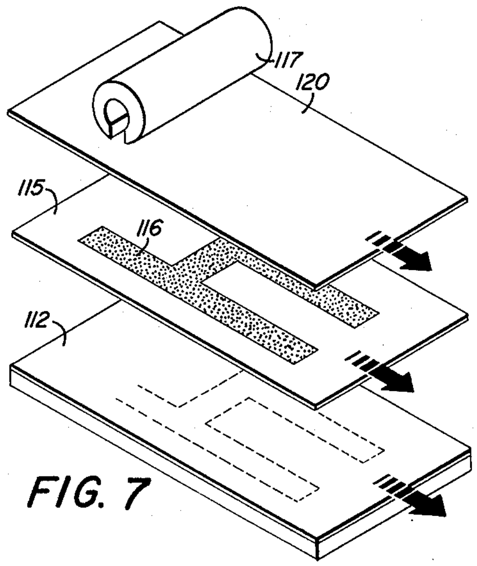
FIG. 7 is an expanded perspective view showing an alternative method of creating upon the image plate a magnetic image of the pattern on the master.

FIGS. 7 and 8 illustrate an alternative method for accomplishing the same result. Plate 112, master 115 and sheet 120 are subjected to the field of magnet 117 by being passed together thereunder. Then, without removing the master, particles 121 are spread upon sheet 120 and removed therefrom as was done above leaving a differentiating configuration thereon.

Printed circuits may be prepared in several ways utilizing the features described above. One method, as shown in FIGS. 9 through 17, consists of marking a master 115 upon a lamina 102 (FIG. 9) wherein a master 115 is prepared by a rubber stamp 130 using magnetic ink. However, it is to be understood that the process is not limited to this means and that any type of master 115, such as those shown in FIGS. 1 through 4, can be substituted with satisfactory results. The image plate 112 is positioned against master 115 and these two elements pass together under the horizontal magnet 117 (FIG. 10). The master 115 is then removed leaving image 118 in the plate 112 (FIG. 11). The phantom stack 131 of sheets 120 (FIG. 10) indicates the alternative procedure illustrated in FIGS. 7 and 8, wherein a sheet 120 is placed on a master 115 prior to its passage under a magnet 117.

A sheet 120 is placed upon plate 112 and these members pass under hopper 122 so that it dispenses particles 145 under distributive control of an air jet 123 (FIGS. 12 and 13).

Referring to FIG. 29, the particles in the process just described are an aggregate of a finely divided (300 mesh or smaller is preferred, although larger particles are operable) ferromagnetic granule 140, such as soft iron, a similarly divided conductive granule 141, such as copper, and a finely divided granule of a fusing element 142, such as a granule of solder or rose metal, for fusing all of these aggregated particles 145 together into an electrically continuous configuration. To aid fusing element 142, a finely divided grain of flux 143 is also present in particle 145. Finally, these granules are held together to form particles 145 by a so-called "core binder" 144, such as wax or shellac or any of many well-known products which can be selected for this purpose. The aggregated particles thus described will be known as "conductive magnetic" particles 145, since it is conductive granule 141 therein which will ultimately carry the current in the final product. The proportions of the component granules may be arranged in accordance with the desired printed circuit characteristics.

The retentive force of image 118 (FIGS. 11 and 12) from beneath sheet 120 restrains the particles thereon against the removal force of the air jet 123, thereby leaving a deposit of magnetic particles upon the sheet 120 in the configuration of representation 116. The "conductive magnetic" particles 145, having been thus formed into a circuit design or pattern 132 in accordance with representation 116 on master 115, will now appear in relief on sheet 120 in the manner shown in the sectional view of FIG. 14. Plate 112 is removed after the particles have been aligned. To facilitate handling of sheet 120 while particles 145 are loosely aligned thereon subsequent to removal of plate 112, it may be desirable, prior to removal of plate 112, to provide a moderate fusing of core binder 144 by means of a heat source, such as an infrared lamp.

In this condition, sheet 120 is next passed through an oven 133, shown diagrammatically in FIG. 15 as an open-ended enclosure 134 with a conveyor 135 and heating element 136. The temperature within the oven is selected such that element 142 will be fused and core binder 144 vaporized without damaging sheet 120. This result can be easily achieved through the proper selection of core binder 144, element 142, and sheet 120.

The oven 133 causes the solder and flux to bond the copper and ferromagnetic granules into a continuous electrical conductor; vaporizes the flux; and causes the core binder to attach to the sheet 120 the copper and ferromagnetic granules thus bonded. After sheet 120 leaves oven 133, the fused circuit 146 thereon may be solder dipped, as indicated in FIGS. 16 and 16*a*, to build up its electrical characteristics. Such dipping provides a coating 147 of solder upon circuit 146 to produce the electrically continuous printed circuit 148 of FIG. 17.

A method, as shown in FIGS. 18 through 28, of preparing printed circuits by etching consists of marking a master 115 by a rubber stamp 130 (FIG. 18) with magnetic ink 104. The process is not limited to this particular type of master, however, since any master 115, such as those shown in FIGS. 1 through 4 can be substituted with satisfactory results. An image plate 112 of highly retentive magnetic material 113 is positioned against a mater 115, and these two elements are subjected together to the flux of a horizontal magnet 117 (see FIG. 19). Thereafter, master 115 is removed leaving image 118 in plate 112 (FIG. 20). The phantom stack 131 of sheets 120 in FIG. 19 indicates the alternative procedure illustrated in FIGS. 7 and 8, as explained above.

A sheet 120 is placed upon plate 112 (FIG. 21) and passed therewith under hopper 122 so that particles 150 under distributive control of an air jet 123 (FIGS. 21 and 22) are deposited upon sheet 120. Because the instant process requires etching, rather than fusing as in the preceding process, in this instance the magnetic particles comprise a finely divided (300 mesh or finer preferred) ferromagnetic granule 140, such as soft iron, coated with a soluble etch-resistant material 151, such as wax or shellac (see FIG. 30). Particles 150 are distributed upon sheet 120 (FIGS. 21 and 22) in the same manner as in the foregoing process. Thereafter particles 150 are fused (FIG. 23) by a heat source shown as an infrared lamp 153. Sheet 120 in this process is provided with a coating or layer of conductive material 154, such as copper (FIG. 24).

Having thus provided the desired protective covering upon the conductive material 154 on the sheet 120, the latter is next subjected to an etching bath 155 shown schematically in FIG. 25. This etching bath removes all the conductive material 154 not protected by the etch-resistant material 151 and produces a product as shown in FIG. 26. Finally, the etch-resistant layer is removed by immersing it in a solvent (FIG. 27), thereby producing a completed, printed circuit 154 upon an insulating sheet, as shown in FIG. 28.

In addition to producing printed electrical circuits, this invention can be used to produce or reproduce conventional printing by using finely divided pigmented magnetic particles 160, which may comprise an aggregate (FIG. 31) of a finely divided (300 mesh or finer is preferred) ferromagnetic granule 140, a similarly divided pigment granule 161, such as graphite, and a "core binder" 162 which can be easily fused, such as wax. The printer 201, shown in FIG. 32, is used for producing original documents and the duplicator 301 of FIG. 36 for reproducing copy. The printer 201 comprises a cylindrical image roller 212 having an outer surface of highly retentive magnetic material, such as cobalt-nickel. One end of roller 212 contains gear teeth 215 for engaging a reduction gear 248. Roller 212 is provided with an axis 216 for rotational mounting of the roller in suitable bearings (not shown).

Rotatably mounted around a fixed hollow shaft 202 parallel with axis 216 of roller 212 is a character drum or cylinder 203. This drum is mounted in suitable bearings 204 and 205 about shaft 202. A retainer ring 206 is threadedly engaged to a bearing housing 207 for retention of bearing 204. Bearing 205 is arranged within an internally protruding housing 214.

A photomultiplier tube 208 is mounted opposite one end of drum 203 radially thereof and in registration with a path of elongated apertures 210 in drum 203. Inside drum 203 is a light source 211 is secured to shaft 202, light source 211, photomultiplier 208 and apertures 210 as they pass therebetween being alignment so as to produce alternating conditions of light and dark on photomultiplier tube 208. Rows of characters are located longitudinally upon drum 203. A separate row is provided for each different character on the drum, and associated with each row of characters is one of the apertures 210.

The construction of the face of drum 203 is best shown by referring to FIG. 33 which represents an enlarged portion thereof. Drum 203 is made of plastic with characters 209 of magnetic material having low retentivity and high permeability embedded therein. For best results, a mu in excess of 30 is desirable. In order to prevent the centrifugal expulsion of characters 209 from drum 203 as it rotates, there is provided in each metal character a peripheral slot or keyway 220 which receives a portion of the plastic drum material.

Referring now to FIG. 34, an alternative construction of drum 203 is shown comprising a magnetic material of high permeability and low retentivity with character depressions etched therein, as was shown and described above with regard to FIG. 3*b*. A non-magnetic supporting material 109 (FIGS. 3*b* and 3*c*) can be used to strengthen the drum if desired. In this embodiment, it is preferable to fill these depressions with plastic so that they do not collect dirt and foreign particles. Etching will ordinarily cause a slight undercutting, as at point 217 (FIG. 3*b*). This slight undercutting prevents the centrifugal expulsion of plastic fillings 219 and is therefore desirable.

A single line of core-type vertical electromagnets 221 is axially aligned inside drum 203 (see FIGS. 32 and 35), one magnet being provided for each column 222 of characters 209 on the drum. The field of each of these magnets covers an area thereunder one row high and a character wide. These magnets are fixed with relation to shaft 202 and are operated by means of electrical connections 223 leading from magnets 221 into and through the hollow interior of shaft 202 by way of ports 224 therein to an electrical pulsing source (not shown), such as the output of a data processing machine. The longitudinal axis of each magnet 221 is located along a radius of drum 203 approximately perpendicular to roller 212, the outer end of each magnet being located very close to the inner circumference of drum 203.

The mechanism for driving drum 203 is comprised of a drive gear 225 connected by a shaft 226 to a motor (not shown). Gear 225 drives a gear 227 mounted on a shaft 228 which protrudes from drum 203. A pawl 230 is carried by the end face of drum 203 for driving a Geneva gear 231 so that for each revolution of drum 203 Geneva gear 231 will rotate its associated shaft 232 one-seventh of a revolution. Shaft 228 is provided with an arcuate dwell member 233 partially encircling shaft 228 with its open arcuate portion 234 radially opposite pawl 230, arranged to coact with the arcs 236 of Geneva gear 231. Roller 212 is intermittently driven in line spacing increments by gears 238 and 248, the latter being a reduction gear which drives the teeth 215 of roller 212.

A web 240 of paper upon which the ultimate printing of information is to be effected is fed to roller 212. Web 240 is then fed via sprocket gear 242*a* fixed to shaft 244 which is driven from teeth 215 of roller 212 via gears 241, 243 and 242 so that the linear speed of web 240 equals the peripheral speed of roller 212. A guide roller 245 is used to properly lead web 240 into roller 212.

An atomizer 250 is provided to deposit particles 160 upon web 240 as it is fed into roller 212. Thereafter, as the web is fed, a vacuum trap 254 is provided to remove excess particles before the web advances to a fixing station 251, which consists of several infrared lamps. A fixed magnet 255 is placed along the lateral surface of roller 212 for erasing the magnetic images 218 after each printing operation is fixed, and a suitable take-up roll 257 is positioned to receive the printed paper web 240 as it leaves a paper feed sprocket roller 256 (FIG. 35).

In its operation, the printer 201 follows the steps of a printing process which may be outlined as follows:

(1) A uniform magnetic field is created in an image plate having an outer surface of highly retentive magnetic material (cobalt-nickel) backed up by a magnetic material of high permeability and low retentivity (image roller 212) by subjecting the highly retentive surface to the field of a magnet (magnet 255).

(2) A master (drum 203) is positioned between a vertical electromagnet (magnet 221) and the image plate (roller 212 with its cobalt-nickel surface).

(3) The master and image plate are subjected together to the field of the magnet (by pulsing magnet 221).

(4) Having thus prepared the image plate, a copy layer (paper 240) positioned thereon is sprayed with pigmented magnetic particles 160, the excess thereof being removed by the vacuum trap 254.

(5) The remaining deposit of pigmented magnetic particles is then heat fused.

Since the aforementioned Geneva mechanism and its associated gearing is arranged so that one-seventh of a revolution of Geneva gear 231 provides a peripheral advance of roller 212 a distance of one line space, the surface of image roller 212 will be advanced one line spacing increment once during each revolution of drum 203. Member 233 seats itself in the arc 236 following the slot engaged by pawl 230, and thereby prevents roller 212 from turning when pawl 230 is not actually engaged.

Creating an image 218 upon the surface of roller 212 is accomplished by pulsing a magnet when a selected character in the magnet's associated column 222 is directly beneath it. This is done as follows.

A photomultiplier tube 208, light source 211, and apertures 210 passing therebetween cooperate to produce clock pulses which are suitably amplified and fed to an electronic counter which identifies the row of characters which is beneath the line of magnets 221 at any given time. The output from a storage means of a data processing machine selects the magnets (hence the columnar positions) to be pulsed for each row of characters. The coincidence of these two directives (indication of which row is in the pulsing position and indication of which magnets are to be pulsed at that time) is determined by a comparator associated with each magnet, and upon coincidence of the directives it acts upon its magnet via a multivibrator circuit causing the magnet to be pulsed. By this means, a line of magnetic images 218 of the characters on the character drum 203 is created upon the image roller 212 for every revolution of the character drum 203. Since drum 203 moves a very small distance during the time that each magnet is pulsed, it is to be understood that the shape of the characters on the character drum is designed to compensate for this motion during pulsing.

Having thus prepared the image roller with a row of magnetic character images, the paper is fed over guide roller 245 and roller 212 past an atomizer 250 and vacuum trap 254 to fixing station 251, where particles 160 are fused on the paper 240. The paper then continues over the feed roller 256 to a take-up roll 257, and the operation cycle is completed (it is to be noted that images 218 on roller 212 are erased by magnet 255 after each operation cycle).

Another embodiment of this invention may be in the form of a duplicating machine 301, as in FIG. 36, which comprises a cylinder 196 rotatably actuated by any suitable means (not shown). Fastened to this cylinder is a master 115 prepared, for example, in the manner suggested in FIG. 2 with magnetic ink 104 or magnetic carbon paper. Inside cylinder 196 and opposite a layer 181 of highly retentive magnetic material upon a roller 180 is located an image-creating horizontal magnet 197, which may be either of a permanent type (as shown) or electrically operated. It is to be understood from the earlier detailed explanation that magnet 197 can be a vertical magnet, and in this event a highly permeable magnetic backing material having low retentivity, such as roller 180, is desirable as well as a magnet similar to magnet 255 of printer 201 to provide an initially homogeneous magnetic field.

The balance of the apparatus of this duplicator is comprised of the same, or similar, elements as shown in printer 201 in FIG. 32, i.e. a roller 180 with a surface of highly retentive magnetic material, atomizer 250, vacuum trap 254, and fixing station 251.

In its operation, this duplication machine performs as follows. The master 115 is first suitably fastened to cylinder 196. This cylinder is then rotated, thereby causing master 115 to pass beneath magnet 197. At the same time, roller 180 is rotated therewith by a suitable gearing mechanism (not shown), the contacting surfaces of master 115 and roller 180 moving at the same speed. This produces upon layer 181 a magnetic image 218 of the printing on master 115.

A paper web 240 is fed over guide roller 245 and onto layer 181, past atomizer 250 and vacuum trap 254 to heat fusing station 251. From this station, the web passes over roller 256 and proceeds to take-up roll 257 (not shown).

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. The process of preparing a magnetic image member from which a printed pattern may be magnetically reproduced including the steps of printing a permeability-discontinuity type magnetic pattern representative of said printed pattern upon a first sheet, creating a homogeneous magnetic flux in a second sheet of magnetic material, placing said first sheet in surface contact with said second sheet, subjecting said sheets non-selectively to a unidirectional magnetic flux in a cross-sectional direction, and removing said first sheet thereby providing a magnetic image of said pattern in said second sheet.

2. The process of preparing a magnetic image member comprising the steps of printing upon a sheet with a marking material having a permeability sufficiently different from that of said sheet so as to vary the reluctance of said printing with respect to the reluctance of said sheet, subjecting a sheet of highly retentive magnetic material to a source of unidirectional flux, placing the first said sheet upon the second said sheet, wiping a permanent magnet over the surface of the first said sheet, and removing the first said sheet.

3. The process of preparing printed copy including the steps of forming a permeable magnetic pattern upon a first member, placing said member in intimate relationship with a second member of magnetic material, providing a uniform magnetic flux in said second member, subjecting said members to a unidirectional magnetic flux, removing said first member, placing a sheet of non-magnetic material upon said second member, selectively distributing fusible magnetic particles pigmented with a marking material upon said sheet, and fusing said particles so distributed to form a printed copy of said pattern.

4. The process of preparing a magnetic image member for reproducing a printed pattern magnetically therefrom including the steps of placing a sheet having a magnetic pattern printed thereupon in the form of permeability-discontinuities representative of said printed pattern in contact with a second sheet of magnetic material, subjecting such sheets non-selectively to a unidirectional flux in the cross-sectional direction and removing said first sheet, thereby providing a magnetic image of said pattern in said second sheet.

References Cited in the file of this patent

UNITED STATES PATENTS

| | | |
|---|---|---|
| 2,381,463 | Potter | Aug. 7, 1945 |
| 2,451,725 | Franklin | Oct. 19, 1948 |
| 2,473,729 | Salz | June 21, 1949 |
| 2,511,121 | Murphy | June 13, 1950 |
| 2,560,474 | Potts | July 10, 1951 |
| 2,561,476 | Lang | July 24, 1951 |
| 2,716,268 | Steigerwalt | Aug. 30, 1955 |
| 2,718,849 | Dresser | Sept. 27, 1955 |
| 2,734,629 | Mueller | May 1, 1956 |
| 2,735,784 | Greig et al. | Feb. 21, 1956 |
| 2,743,629 | Pellegrino | May 1, 1956 |
| 2,758,939 | Sugarman | Aug. 14, 1956 |
| 2,802,049 | Masterson | Aug. 6, 1957 |
| 2,848,748 | Crump | Aug. 26, 1958 |
| 2,910,351 | Szpak et al. | Oct. 27, 1959 |
| 2,996,575 | Sims | Aug. 15, 1961 |

FOREIGN PATENTS

| | | |
|---|---|---|
| 733,484 | Great Britain | July 13, 1955 |